(12) United States Patent
Shin

(10) Patent No.: US 9,010,731 B2
(45) Date of Patent: Apr. 21, 2015

(54) HEIGHT ADJUSTING DEVICE FOR VEHICLE SUSPENSION SEAT

(75) Inventor: Chun-Ho Shin, Chungcheongnam-do (KR)

(73) Assignee: Han Il E Hwa Co., Ltd., Seoul (KR)

( * ) Notice: Subject to any disclaimer, the term of this patent is extended or adjusted under 35 U.S.C. 154(b) by 259 days.

(21) Appl. No.: 13/704,800

(22) PCT Filed: Jun. 20, 2011

(86) PCT No.: PCT/KR2011/004472
§ 371 (c)(1),
(2), (4) Date: Feb. 11, 2013

(87) PCT Pub. No.: WO2012/036373
PCT Pub. Date: Mar. 22, 2012

(65) Prior Publication Data
US 2013/0168624 A1    Jul. 4, 2013

(30) Foreign Application Priority Data

Sep. 16, 2010 (KR) .................... 10-2010-0090901

(51) Int. Cl.
*B66F 3/44* (2006.01)
*B60N 2/16* (2006.01)
*B60N 2/50* (2006.01)
*B60N 2/52* (2006.01)

(52) U.S. Cl.
CPC ............ *B60N 2/1665* (2013.01); *B60N 2/502* (2013.01); *B60N 2/505* (2013.01); *B60N 2/508* (2013.01); *B60N 2/525* (2013.01)

(58) Field of Classification Search
USPC ............ 254/122, 126, 124; 267/64.28, 64.27, 267/120, 131, 142; 297/344.12, 338; 248/421, 422, 423
See application file for complete search history.

(56) References Cited

FOREIGN PATENT DOCUMENTS

| JP | 9020165 A | 1/1997 |
|---|---|---|
| JP | 2008049852 A | 3/2008 |
| JP | 2010030473 A | 2/2010 |
| KR | 20-0293230 | 10/2002 |

OTHER PUBLICATIONS

International Search Report for PCT/KR2011/004472 Jan. 2, 2012.

*Primary Examiner* — Lee D Wilson
*Assistant Examiner* — Nirvana Deonauth
(74) *Attorney, Agent, or Firm* — Pearne & Gordon LLP

(57) ABSTRACT

A height adjusting device for a vehicle suspension seat includes: a control valve having an air injection pin and an air discharge pin formed therein; a first push support having one end rotatably coupled to the control valve and pressurizing the air injection pin when rotated in one direction; a second push support having one end rotatably coupled to the control vale, pressurizing the air discharge pin when rotated in one direction, and disposed to correspond to the first push support; a first push rod pressurizing the other end of the first push support so as to rotate the first push support; and a second push rod pressurizing the other end of the second push support so as to rotate the second push support, and disposed to correspond to the first push rod.

6 Claims, 5 Drawing Sheets

HEIGHT ADJUSTING DEVICE FOR VEHICLE SUSPENSION SEAT

BACKGROUND OF THE INVENTION

The present invention relates to a height adjusting device for a vehicle suspension seat, and more particularly, to a height adjusting device for a vehicle suspension seat which may be operated by way of a small pressurizing force through first and second push supports provided therein.

Conventionally, a vehicle seat includes devices for adjusting the positions of a seat back and a seat cushion according to a passenger's body type. For example, the vehicle seat may include a lever device for adjusting the angle of the seat back. In some cases, the vehicle seat may include a device for adjusting the height of the vehicle seat.

Examples of the device for adjusting the height of the vehicle seat may include a suspension seat. The suspension seat is disposed under the vehicle seat so as to support the vehicle seat, and adjusts the height of the vehicle seat according to a passenger's body type.

Typically, the suspension seat includes an air spring and a control valve. The control valve injects or discharges air into or from the air spring according to a user's manipulation, and the air spring is expanded or contracted by the injection or discharge of air so as to lift or lower the suspension seat.

SUMMARY OF THE INVENTION

An embodiment of the present invention is directed to a height adjusting device for a vehicle suspension seat, which may operate a control valve through a small pressurizing force, thereby easily adjusting the height of the vehicle suspension seat.

In accordance with an embodiment of the present invention, a height adjusting device for a vehicle suspension seat includes: a control valve having an air injection pin and an air discharge pin formed therein; a first push support having one end rotatably coupled to the control valve and pressurizing the air injection pin when rotated in a first direction; a second push support having one end rotatably coupled to the control valve, pressurizing the air discharge pin when rotated in a second direction, and disposed to correspond to the first push support; a first push rod pressurizing the other end of the first push support so as to rotate the first push support; and a second push rod pressurizing the other end of the second push support so as to rotate the second push support, and disposed to correspond to the first push rod.

The one end of the U-shaped first push support may be rotatably coupled to the control valve such that an inner surface of the first push support is contacted with the air injection pin, and the other end of the first push support may be bent along a horizontal direction Furthermore, the second push support is formed in U-shape, one end of which may be rotatably coupled to the control valve such that an inner surface of the second push support is contacted with the air discharge pin, and the other end of which may be bent along a horizontal direction.

The height adjusting device may further include an arm rod rotated by an operation of a height adjusting lever, wherein the first and second push rods are coupled to a rotating shaft of the arm rod and rotated together when the arm rod is rotated.

The height adjusting device may further include an arm rod spring coupled to the rotating shaft of the arm rod and elastically supporting the first and second push rods with respect to the rotation direction.

The height adjusting device may further include a restoring spring coupled to one side of the arm rod so as to provide a restoring force when the arm rod is rotated.

DESCRIPTION OF SPECIFIC EMBODIMENTS

Figure 1:
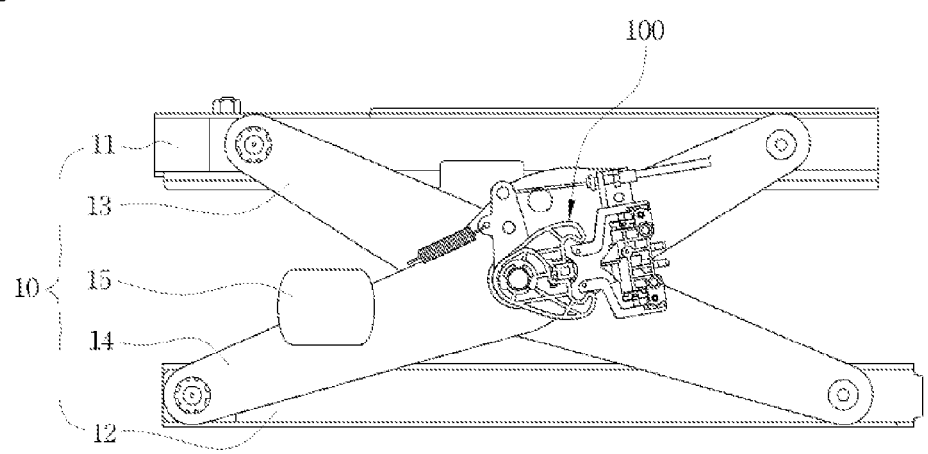
FIG. 1 is a front view of a vehicle suspension seat in which a height adjusting device for a vehicle suspension seat is mounted in accordance with an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a front view of a vehicle suspension seat 10 in which a height adjusting device 100 for a vehicle suspension seat is mounted in accordance with an embodiment of the present invention.

Referring to FIG. 1, the vehicle suspension seat 10 may include an upper frame 11 and a lower frame 12. The upper frame 11 is disposed under a vehicle seat (not illustrated) so as to support the vehicle seat. The lower frame 12 is disposed under the upper frame 11 and fixed to the bottom surface of the vehicle.

Meanwhile, the vehicle suspension seat 10 may include an inner link 13 and an outer link 14 which connect the upper frame 11 and the lower frame 12. One side of the inner link 13 is rotatably coupled to the upper frame 11, and the other end of the inner link 13 is rotatably coupled to the lower frame 12. Furthermore, one end of the outer link 14 is rotatably coupled to the upper frame 11, and the other end of the outer link 14 is rotatably coupled to the lower frame 12.

At this time, the inner link 13 and the outer link 14 may be arranged to perpendicularly cross each other in an X-shape. Furthermore, the inner link 13 and the outer link may be coupled to rotate about the intersection. Therefore, as the inner link 13 and the outer link 14 rotate about the intersection, the upper frame 11 is lifted or lowered (refer to FIGS. 5 and 6).

The vehicle suspension seat 10 may include an air spring 15 disposed between the inner link 13 and the outer link 14. When air is injected into the air spring 15, the air spring 15 is expanded upward to lift the upper frame 11. Furthermore, when the air stored in the air spring 15 is discharged outside, the air spring 15 is contracted to lower the upper frame 11 (refer to FIGS. 5 and 6).

Meanwhile, the height adjusting device 100 for a vehicle suspension seat may be mounted in accordance with the embodiment of the present invention at the intersection between the inner link 13 and the outer link 14. The height adjusting device 100 for a vehicle suspension seat injects or discharges air into or from the air spring 15 according to a user's manipulation.

Hereinafter, the height adjusting device 100 for a vehicle suspension seat will be described in detail with reference to the drawings.

Figure 2:
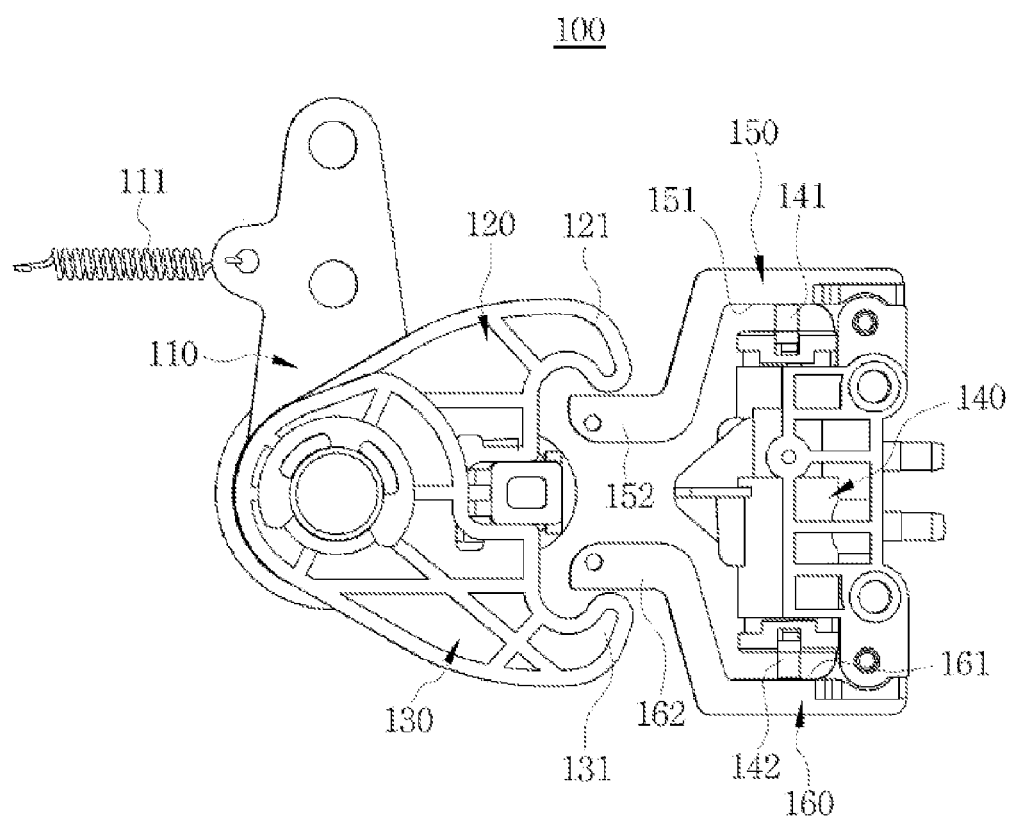
FIG. 2 is a front view of the height adjusting device for a vehicle suspension seat, as illustrated in FIG. 1.
Figure 3:
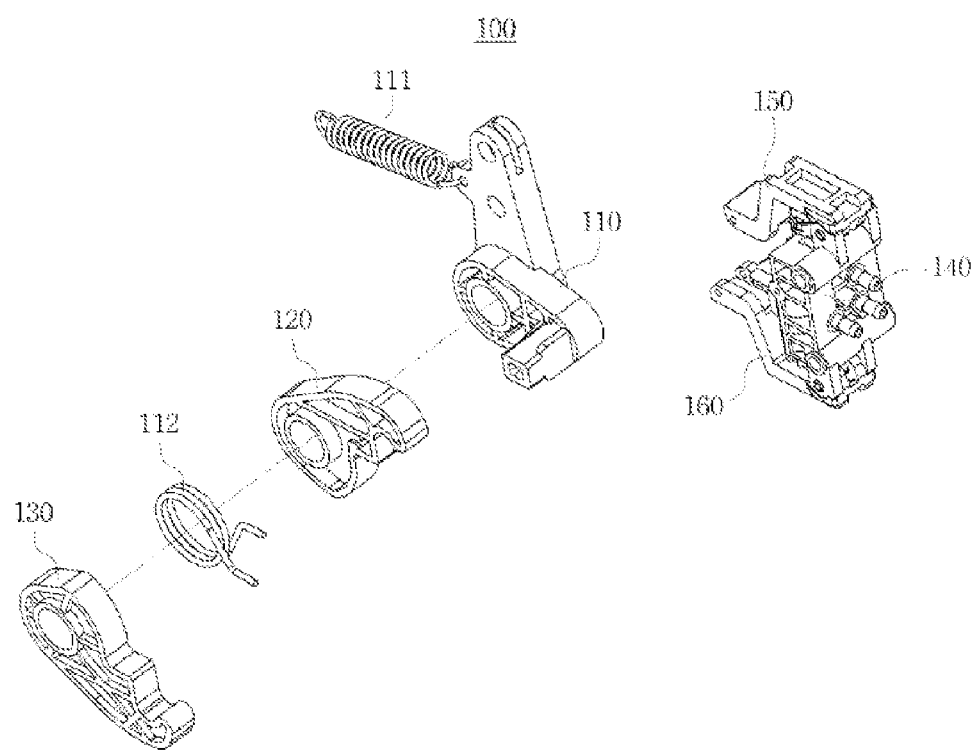
FIG. 3 is an expanded perspective view of the height adjusting device for a vehicle suspension seat, as illustrated in FIG. 1.

FIG. 2 is a front view of the height adjusting device 100 for a vehicle suspension seat, illustrated in FIG. 1. FIG. 3 is an expanded perspective view of the height adjusting device 100 for a vehicle suspension seat, illustrated in FIG. 1.

Referring to FIGS. 2 and 3, the height adjusting device 100 for a vehicle suspension seat may include an arm rod 110. The arm rod 110 may be coupled to one side of the outer link 14. At this time, the arm rod 110 may be coupled so as to rotate about the intersection between the inner link 13 and the outer link 14.

Meanwhile, the arm rod 110 may be connected to a height adjusting lever (not illustrated). Therefore, as a user manipulates the height adjusting lever (not illustrated), the arm rod 110 may be rotated. Furthermore, one side of the arm rod 110 may be coupled to a restoring spring 111. The restoring spring 111 provides a restoring force to the arm rod 110 when the arm rod 110 is rotated.

Meanwhile, the height adjusting device 100 for a vehicle suspension seat includes a first push rod 120 and a second push rod 130. The first push rod 120 and the second push rod 130 are coupled to a rotating shaft of the arm rod 110 and thus rotated together when the arm rod 110 is rotated.

At this time, an arm rod spring 112 may be coupled to the rotating shaft of the arm rod 110. The arm rod spring 112 elastically supports the first and second push rods 120 and 130 with respect to the rotation direction. Therefore, through the arm rod spring 112, the first push rod 120 may be smoothly rotated to pressurize a first push support 150, the process of which will be described below. Furthermore, through the arm rod spring 112, the second push rod 130 may be smoothly rotated to pressurize a second push support 160, the process of which will also be described below.

Meanwhile, the first push rod 120 may have a first pressurization protrusion 121 formed at one side thereof. The first pressurization protrusion 121 pressurizes one end of the first push support 150 when the first push rod 120 is rotated. Furthermore, the second push rod 130 may have a second pressurization protrusion 131 formed at one side thereof. The second pressurization protrusion 131 pressurizes one end of the second push support 160 when the second push rod 130 is rotated.

The height adjusting device 100 for a vehicle suspension seat includes a control valve 140. The control valve 140 respectively injects or discharges air into or from the air spring 15 (refer to FIG. 1).

The control valve 140 includes an air injection pin 141. As the air injection pin 141 is pressed, the control valve 140 injects air into the air spring 15. Furthermore, the control valve 140 includes an air discharge pin 142. As the air discharge pin 142 is pressed, the control valve 140 discharges the air stored in the air spring 15 outside.

Meanwhile, the height adjusting device 100 for a vehicle suspension seat includes a first push support 150 and a second push support 160.

The first push support 150 may be formed in what could be considered as substantially a U-shape. At this time, one end of the first push support 150 may be rotatably coupled to the control valve 140.

Furthermore, the first push support 150 may be formed in such a manner that an inner surface 151 thereof is contacted with the air injection pin 141. Therefore, when the first push support 150 is rotated in a first direction, the inner surface 151 pressurizes the air injection pin 141.

The other end of the first push support 150 is bent along a horizontal direction so as to form a first pressurization portion 152. At this time, the first pressurization portion 152 may be disposed adjacent to the first pressurization protrusion 121. Therefore, when the first push rod 120 is rotated, the first pressurization protrusion 121 pressurizes the first pressurization portion 152 so as to operate the first push support 150.

Meanwhile, the second push support 160 may be formed in a U-shape corresponding to the first push support 150. At this time, one end of the second push support 160 may be rotatably coupled to the control valve 140.

Furthermore, the second push support 160 may be formed in such a manner that an inner surface 161 thereof is contacted with the air discharge pin 142. Therefore, when the second push support 160 is rotated in a second direction, the inner surface 161 pressurizes the air discharge pin 142.

The other end of the second push support 160 is bent along a horizontal direction so as to form a second pressurization portion 162. At this time, the second pressurization portion 162 may be disposed adjacent to the second pressurization protrusion 131. Therefore, when the second push rod 130 is rotated, the second pressurization protrusion 131 pressurizes the second pressurization portion 162 so as to operate the second push support 160.

Hereinafter, the operation of the height adjusting device 100 for a vehicle suspension seat will be described with reference to the drawings.

Figure 4:
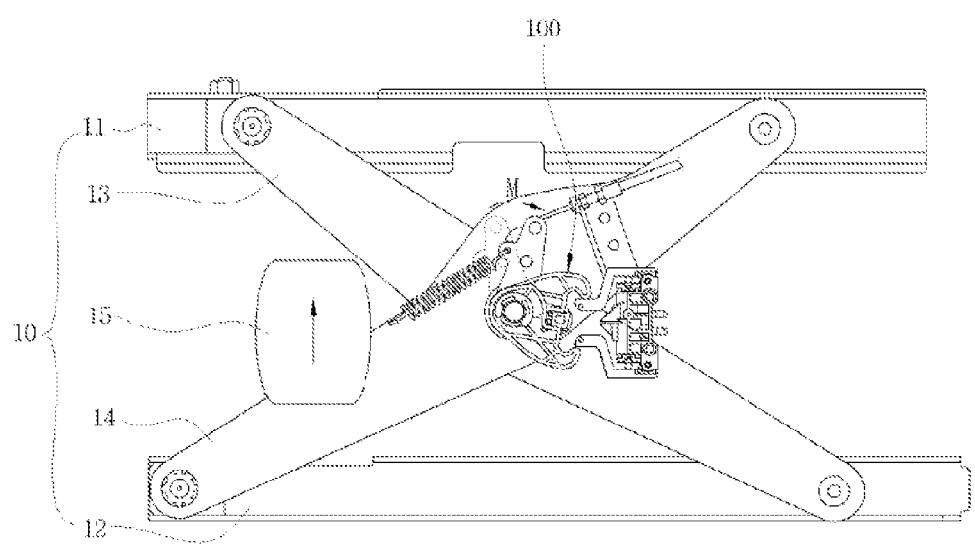
FIG. 4 is a diagram illustrating a first operation of the height adjusting device of FIG. 1.

FIG. 4 is a diagram illustrating a first operation of the height adjusting device 100 of FIG. 1.

Referring to FIG. 4, a user operates a height adjusting lever (not illustrated). As the user operates the height adjusting lever, the arm rod 110 is rotated in a direction M of FIG. 4. As the arm rod 110 is rotated, the first push rod 120 and the second push rod 130 are rotated.

At this time, the first pressurization protrusion 121 of the first push rod 120 pressurizes the first pressurization portion 152 of the first push support 150. As the first pressurization portion 152 is pressed, the first push support 150 is rotated. That is, since one end of the first push support 150 is rotatably coupled to the control valve 140, the first push support 150 is rotated about the one end.

As the first push support 150 is rotated, the inner surface 151 of the first push support 150 pressurizes the air injection pin 141. At this time, the first push support 150 performs a function similar to that of a lever.

That is, in the first push support 150, the portion coupled to the control valve 140 serves as a supporting point, and the portion functioning to pressurize the air injection pin 141 serves as a point of application. Furthermore, the first pressurization portion 152 receiving the pressurizing force of the first push rod 120 serves as a point of force. Therefore, the first push rod 120 may sufficiently pressurize the air injection pin 141 with a small pressurizing force.

Meanwhile, when the air injection pin 141 is pressed by the first push support 150, the control valve 140 injects air into the air spring 15. When the air is injected into the air spring 15, the air spring 15 is expanded upward to lift the upper frame 11.

Figure 5:
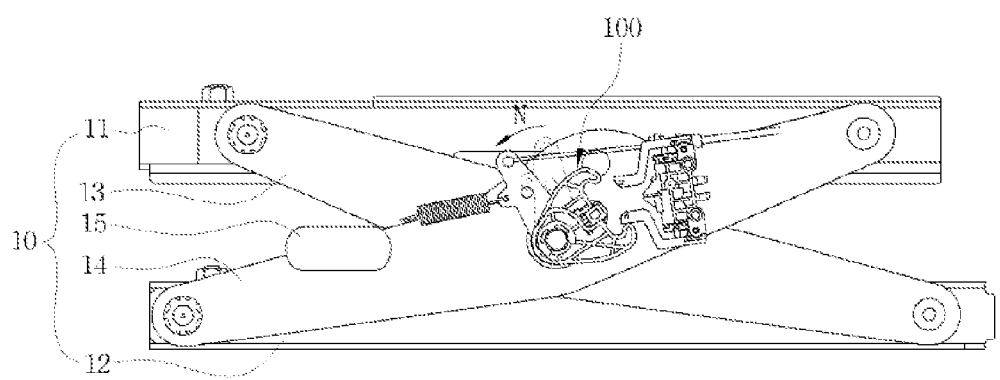
FIG. 5 is a diagram illustrating a second operation of the height adjusting device of FIG. 1.

FIG. 5 is a diagram illustrating a second operation of the height adjusting device 100 of FIG. 1.

Referring to FIG. 5, when the user operates the height control lever, the arm rod 110 is rotated in a direction N of FIG. 5. As the arm rod 110 is rotated, the first push rod 120 and the second push rod 130 are rotated.

At this time, the second pressurization protrusion 131 of the second push rod 130 pressurizes the second pressurization portion 162 of the second push support 160. As the second pressurization portion 162 is pressed, the second push support 160 is rotated. As the second push support 160 is rotated, the inner surface 161 of the second push support 160 pressurizes the air discharge pin 142. This process is performed in the same manner as described with reference to FIG. 4. Therefore, the detailed descriptions thereof are omitted herein.

Meanwhile, when the air discharge pin 142 is pressed by the second push support 160, the control valve 140 discharges air stored in the air spring 15 to the outside. While the air stored in the air spring 15 is discharged, the air spring 15 is contracted to lower the upper frame 11.

As described above, the height adjusting device 100 for a vehicle suspension seat in accordance with an embodiment of the present invention includes the first and second push supports 150 and 160 performing a similar function to that of a lever. Therefore, the control valve 140 may be manipulated even by a small pressurizing force.

Therefore, the height adjusting device 100 for a vehicle suspension seat may smoothly adjust the height of the vehicle seat. Furthermore, a user may manipulate the height adjusting lever by applying merely a small force. Therefore, the manipulation feeling and user convenience are improved.

Furthermore, as the pressurizing force applied to the control valve 140 decreases, the durability of the control valve 140 may be increased, and the damage to and wear of related parts such as the first and second push rods 120 and 130 may be reduced.

While the present invention has been described with respect to the specific embodiments, it will be apparent to those skilled in the art that various changes and modifications may be made without departing from the spirit and scope of the invention as defined in the following claims.

Since the height adjusting device for a vehicle suspension seat in accordance with the embodiment of the present invention includes the first and second supports, the control valve 140 may be operated even by a small pressurizing force.

Therefore, the height of the vehicle seat may be easily adjusted, and a user may manipulate the height control lever by applying a small force.

Furthermore, as the pressurizing force applied to the control valve decreases, the durability of the control valve may be increased and the damage to and wear of the related parts may be reduced.

What is claimed is:

1. A height adjusting device for a vehicle suspension seat, comprising:
    a control valve having an air injection pin and an air discharge pin formed therein;
    a first push support having a first end rotatably coupled to the control valve and pressurizing the air injection pin when rotated in a first direction;
    a second push support having a first end rotatably coupled to the control valve, pressurizing the air discharge pin when rotated in a second direction, and disposed to correspond to the first push support;
    a first push rod having a protrusion configured to apply a force to a second end of the first push support so as to rotate the first push support in the first direction; and
    a second push rod having a protrusion configured to apply a force to a second end of the second push support so as to rotate the second push support in the second direction, and disposed to correspond to the first push rod.

2. The height adjusting device of claim 1, wherein the first push support is formed in a U-shape, the first end of which is rotatably coupled to the control valve such that an inner surface of the first push support is contacted with the air injection pin, and the second end of which is bent in a horizontal direction.

3. The height adjusting device of claim 1, wherein the second push support is formed in a U-shape, the first end of which is rotatably coupled to the control valve such that an inner surface of the second push support is contacted with the air discharge pin, and the second end of which is bent in a horizontal direction.

4. The height adjusting device of claim 1, further comprising an arm rod rotated by an operation of a height adjusting lever,
    wherein the first and second push rods are coupled to a rotating shaft of the arm rod and rotated together in a rotation direction when the arm rod is rotated.

5. The height adjusting device of claim 4, further comprising an arm rod spring coupled to the rotating shaft of the arm rod and elastically supporting the first and second push rods with respect to the rotation direction.

6. The height adjusting device of claim 4, further comprising a restoring spring coupled to one side of the arm rod so as to provide a restoring force when the arm rod is rotated.

* * * * *

UNITED STATES PATENT AND TRADEMARK OFFICE
CERTIFICATE OF CORRECTION

| | |
|---|---|
| PATENT NO. | : 9,010,731 B2 |
| APPLICATION NO. | : 13/704800 |
| DATED | : April 21, 2015 |
| INVENTOR(S) | : Chun-Ho Shin |

It is certified that error appears in the above-identified patent and that said Letters Patent is hereby corrected as shown below:

In the specification,

Column 2, line 54, "Furthermore, the inner link 13 and the outer link may be" should read --Furthermore, the inner link 13 and the outer link 14 may be--.

Signed and Sealed this
Seventeenth Day of November, 2015

Michelle K. Lee
*Director of the United States Patent and Trademark Office*